US012737371B2

(12) United States Patent
Liang et al.

(10) Patent No.: US 12,737,371 B2
(45) Date of Patent: Sep. 15, 2026

(54) PIPELINE FOR EFFICIENT PROCESSING OF STRUCTURED DATA

(71) Applicant: Capital One Financial Corporation, McLean, VA (US)

(72) Inventors: Shucheng Liang, Shanghai (CN); Tian Liu, Shanghai (CN); Amy Chen, Shanghai (CN)

(73) Assignee: Capital One Financial Corporation, McLean, VA (US)

( * ) Notice: Subject to any disclaimer, the term of this patent is extended or adjusted under 35 U.S.C. 154(b) by 0 days.

(21) Appl. No.: 19/073,997

(22) Filed: Mar. 7, 2025

(65) Prior Publication Data

US 2026/0236482 A1 Aug. 13, 2026

Related U.S. Application Data

(63) Continuation of application No. PCT/CN2025/076149, filed on Feb. 7, 2025.

(51) Int. Cl.

*G06F 16/00* (2019.01)
*G06F 16/21* (2019.01)
*G06F 16/22* (2019.01)
*G06F 16/248* (2019.01)

(52) U.S. Cl.

CPC .......... *G06F 16/248* (2019.01); *G06F 16/211* (2019.01); *G06F 16/221* (2019.01); *G06F 16/2255* (2019.01)

(58) Field of Classification Search

CPC ................ G06F 16/248; G06F 16/221; G06F 16/2255; G06F 16/211

See application file for complete search history.

(56) References Cited

U.S. PATENT DOCUMENTS 9,170,848 B1 * 10/2015 Goldman ............ G06F 16/2228
10,437,848 B2 10/2019 Agarwal et al.
11,216,454 B1 * 1/2022 Cole ......................... G06F 8/30
2015/0379072 A1 12/2015 Dirac et al.
2021/0248143 A1 * 8/2021 Khillar ................ G06F 16/2379
2024/0028591 A1 * 1/2024 Balakrishnan .... G06F 16/24539
2024/0289306 A1 * 8/2024 Alickaj ................. G06F 16/245
2025/0390276 A1 * 12/2025 Liao .......................... G06F 7/24

FOREIGN PATENT DOCUMENTS

CN 105677486 B 3/2019

* cited by examiner

*Primary Examiner* — Michelle N Owyang

(74) *Attorney, Agent, or Firm* — Lee Sullivan Shea & Smith LLP

(57) ABSTRACT

A computing platform is configured to (i) identify one or more data sets to be used as input for one or more data processing operations, (ii) determine a computing resource allocation, (iii) receive an indication of a user-defined function, the user-defined function corresponding to a desired output of the one or more data processing operations, (iv) based on (a) the computing resource allocation and (b) the user-defined function, divide the data set into a plurality of data subsets each to be processed in a respective sub-task by one of a plurality of parallel worker processes, (v) execute, in each worker process simultaneously, a respective batch of sub-tasks by processing corresponding batch of respective data subsets using the user-defined function to generate a respective batch result, (vi) combine the respective results from each worker process to generate a combined result, and (vii) output the combined result.

20 Claims, 12 Drawing Sheets

PIPELINE FOR EFFICIENT PROCESSING OF STRUCTURED DATA

CROSS-REFERENCE TO RELATED APPLICATIONS

This application is a continuation of International Application No. PCT/CN2025/076149, filed on Feb. 7, 2025 and entitled "PIPELINE FOR EFFICIENT PROCESSING OF STRUCTURED DATA," the contents of which are hereby incorporated by reference in their entirety.

BACKGROUND

An increasing number of technology areas are becoming driven by data and the analysis of such data to develop insights. As usage, applications, and data volumes grow, the demands on computing resources to process the data and provide analyses also grow. There is a need to facilitate efficient use of these computing resources.

Overview

Disclosed herein is new software technology for processing large data sets in an efficient manner that considers, and facilitates efficient use of, the particular computing resources available for the particular data processing problem.

In one aspect, the disclosed software technology may take the form of a method to be carried out by a computing platform that involves (i) identifying one or more data sets to be used as input for one or more data processing operations, (ii) determining a computing resource allocation to be used for the one or more data processing operations, (iii) receiving an indication of at least one user-defined function to be applied to the one or more data sets during the one or more data processing operations, the at least one user-defined function corresponding to a desired output of the one or more data processing operations, (iv) based on (a) the computing resource allocation and (b) the at least one user-defined function, dividing the one or more data sets into a plurality of data subsets, each comprising an array of values from the one or more data sets to be processed in a respective sub-task by one of a plurality of parallel worker processes, (v) using the computing resource allocation, executing, in each worker process simultaneously, a respective batch of sub-tasks by processing a corresponding batch of respective data subsets using the user-defined function to thereby generate a respective batch result associated with the worker process, (vi) combining the respective results from each worker process of the plurality of worker process to generate a combined result, and (vii) outputting the combined result.

In some examples, the data set comprises a plurality of rows of data and one or more columns of data, and dividing the data set into a plurality of data subsets comprises dividing the one or more data sets into a plurality of data subsets each comprising one or more rows of the plurality of rows of the data set.

Further, in some examples, dividing the data set into a plurality of data subsets comprises dividing the one or more data sets into a plurality of data subsets each comprising one or more rows of the plurality of rows of the one or more data sets by randomly assigning one or more rows of the plurality of rows to a data subset of the plurality of data subsets.

Further, in some examples, dividing the data set into a plurality of data subsets comprises dividing the one or more data sets into a plurality of data subsets each comprising one or more rows of the plurality of rows of the one or more data sets by (a) assigning each row of the plurality of rows a hash key from a plurality of hash keys (b) grouping rows of the plurality of rows based on assigned hash keys.

Still further, in some examples, the data set comprises a plurality of columns of data and one or more rows of data, and dividing the data set into a plurality of data subsets comprises dividing the one or more data sets into a plurality of data subsets each comprising one or more columns of the plurality of columns of the one or more data sets.

Still further, in some examples, dividing the data set into a plurality of data subsets comprises dividing the one or more data sets into a plurality of data subsets each comprising one or more columns of the plurality of columns of the one or more data sets by one or both of (i) randomly assigning one or more columns of the plurality of columns to a data subset of the plurality of data subsets and (ii) assigning one or more columns of the plurality of columns to a data subset of the plurality of data subsets based on a user-defined schema.

Still further, in some examples, identifying a data set to be used as input for one or more data processing operations comprises identifying a first data set and at least a second data set to be used as input for the one or more data processing operations, wherein the one or more data processing operations comprise joining the first data set with at least the second data set to form a merged data set, and where dividing the one or more data sets comprises dividing each data set into a plurality of data subsets each comprising one or more rows of a plurality of rows of the data set by (a) assigning each row of the plurality of rows a hash key from a plurality of hash keys and (b) grouping rows of the plurality of rows based on assigned hash keys. The method further involves joining each respective subset of the first data set with corresponding subsets of at least the second data set having the same hash keys based on a user-defined merge key, thereby forming the merged data set.

Still further, in some examples, the computing resource allocation comprises a plurality of processor cores, wherein each processor core in the plurality of processor cores executes the respective batch of sub-tasks in a respective one of the plurality of worker process.

Still further, in some examples, determining a computing resource allocation to be used for the one or more data processing operations comprises determining the computing resource allocation based on a total available computing resources, which is provided as a user input, together with an indication of the one or more data sets and an indication of the user-defined function.

In another aspect, disclosed herein is a computing platform that includes at least one processor, at least one non-transitory computer-readable medium, and program instructions stored on the at least one non-transitory computer-readable medium that are executable by the at least one processor to cause the computing platform to carry out the functions disclosed herein, including but not limited to the functions of the foregoing method.

In yet another aspect, disclosed herein is a non-transitory computer-readable medium that is provisioned with program instructions that are executable to cause a computing platform to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

Organizations in many different industries have begun to operate computing platforms that are configured to ingest, process, analyze, generate, store, and/or output data that is relevant to the businesses of those organizations, which are often referred to as "data platforms." For example, a financial institution may operate a data platform that is configured to ingest, process, analyze, generate, store, and/or output data related to the financial institution's customers and their financial accounts, such as financial transactions data (among other types of data that may be relevant to the financial institution's business). As another example, an organization interested in monitoring the state and/or operation of physical objects such as industrial machines, transport vehicles, and/or other Internet-of-Things (IoT) devices may operate a data platform that is configured to ingest, process, analyze, generate, store, and/or output data related to those physical objects of interest. As another example, a provider of a Software-as-a-Service (SaaS) application may operate a data platform that is configured to ingest, process, analyze, generate, store, and/or output data that is created in connection with that SaaS application. Many other examples are possible as well.

Figure 1:
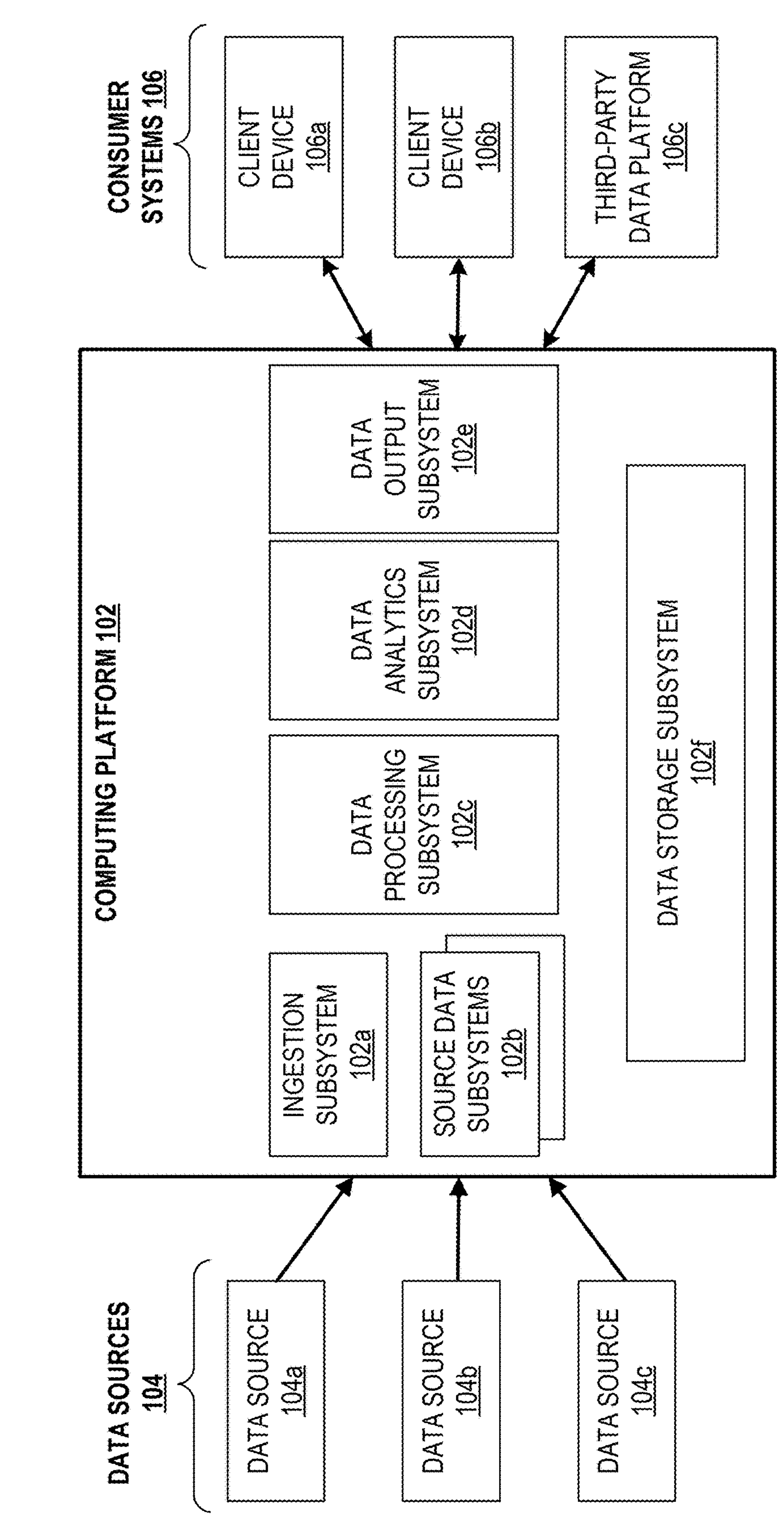
FIG. 1 is a simplified block diagram of an example network environment in which an example data platform may operate.

To illustrate with an example, FIG. 1 depicts a network environment 100 that includes at its core an example computing platform 102 that serves as a data platform for an organization, which may comprise a collection of functional subsystems that are each configured to perform certain functions in order to facilitate tasks such as data ingestion, data generation, data processing, data analytics, data storage, and/or data output. These functional subsystems may take various forms.

For instance, as shown in FIG. 1, the example computing platform 102 may comprise an ingestion subsystem **102*a* that is generally configured to ingest source data from a particular set of data sources 104, such as the three representative data sources 104*a*, 104*b*, and 104*c* shown in FIG. 1, over respective communication paths. These data sources 104 may take any of various forms, which may depend at least in part on the type of organization operating the example computing platform 102. For example, if the example computing platform 102 comprises a data platform operated by a financial institution, the data sources 104 may comprise computing devices and/or systems that generate and output data related to the financial institution's customers and their financial accounts, such as financial transactions data (e.g., purchase and/or sales data, payments data, etc.), customer identification data (e.g., name, address, social security number, etc.), customer interaction data (e.g., web-based interactions with the financial institution such as logins), and/or credit history data, among various other possibilities. In this respect, the data sources that generate and output such data may take the form of payment processors, merchant service provider systems such as payment gateways, point-of-sale (POS) terminals, automated teller machines (ATMs), computing systems at brick-and-mortar branches of the financial institution, and/or client devices of customers (e.g., personal computers, mobile phones, tablets, etc.), among various other possibilities. The data sources 104** may take various other forms as well.

Further, as shown in FIG. 1, the example computing platform 102 may comprise one or more source data subsystems **102*b* that are configured to internally generate and output source data that is consumed by the example computing platform 102. These source data subsystems 102*b* may take any of various forms, which may depend at least in part on the type of organization operating the example computing platform 102. For example, if the example computing platform 102 comprises a data platform operated by a financial institution, the one or more source data subsystems 102*b* may comprise functional subsystems that internally generate and output certain types of data related to customer accounts (e.g., account balance data, payment schedule data, etc.). The one or more source data subsystems 102*b*** may take various other forms as well.

Further yet, as shown in FIG. 1, the example computing platform 102 may comprise a data processing subsystem **102*c*** that is configured to carry out certain types of processing operations on the source data. These processing operations could take any of various forms, including but not limited to data preparation, transformation, and/or integration operations such as validation, cleansing, deduplication, filtering, aggregation, summarization, enrichment, restructuring, reformatting, translation, mapping, etc.

Still further, as shown in FIG. 1, the example computing platform 102 may comprise a data analytics subsystem **102*d* that is configured to carry out certain types of data analytics operations based on the processed data in order to derive insights, which may depend at least in part on the type of organization operating the example computing platform 102. For example, if the example computing platform 102 comprises a data platform operated by a financial institution, the data analytics subsystem 102***d* may be configured to carry out data analytics operations in order to derive certain types of insights that are relevant the financial institution's business, examples of which could include predictions of fraud or other suspicious activity on a customer's account and predictions of whether to extend credit to an existing or prospective customer, among other possibilities. The data analytics subsystem 102*d* may be configured to carry out any of numerous other types of data analytics operations as well.

Moreover, the data analytics operations carried out by the data analytics subsystem 102*d* may be embodied in any of various forms. As one possibility, a data analytics operation may be embodied in the form of a user-defined rule (or set of rules) that is applied to a particular subset of the processed data in order to derive insights from that processed data. As another possibility, a data analytics operation may be embodied in the form of a data science model that is applied to a particular subset of the processed data in order to derive insights from that processed data. In practice, such a data science model may comprise a machine learning model that has been created by applying one or more machine learning techniques to a set of training data, but data science models for performing data analytics operations could take other forms and be created in other manners as well. The data analytics operations carried out by the data analytics subsystem 102*d* may be embodied in other forms as well.

Referring again to FIG. 1, the example computing platform 102 may also comprise a data output subsystem 102*e* that is configured to output data (e.g., processed data and/or derived insights) to certain consumer systems 106 over respective communication paths. These consumer systems 106 may take any of various forms.

For instance, as one possibility, the data output subsystem 102*e* may be configured to output certain data to client devices that are running software applications for accessing and interacting with the example computing platform 102, such as the two representative client devices 106*a* and 106*b* shown in FIG. 1, each of which may take the form of a desktop computer, a laptop, a netbook, a tablet, a smartphone, or a personal digital assistant (PDA), among other possibilities. These client devices may be associated with any of various different types of users, examples of which may include individuals that work for or with the organization operating the example computing platform 102 (e.g., employees, contractors, etc.) and/or customers of the organization operating the example computing platform 102. Further, the software applications for accessing and interacting with the example computing platform 102 that run on these client devices may take any of various forms, which may depend at least in part on the type of user and the type of organization operating the example computing platform 102. As another possibility, the data output subsystem 102*e* may also be configured to output certain data to other third-party data platforms, such as the representative third-party data platform 106*c* shown in FIG. 1.

In order to facilitate this functionality for outputting data to the consumer systems 106, the data output subsystem 102*e* may comprise one or more Application Programming Interface (APIs) that can be used to interact with and output certain data to the consumer systems 106 over a data network, and perhaps also an application service subsystem that is configured to drive the software applications running on the client devices, among other possibilities.

The data output subsystem 102*e* may be configured to output data to other types of consumer systems 106 as well.

Referring once more to FIG. 1, the example computing platform 102 may also comprise a data storage subsystem 102*f* that is configured to store all of the different data within the example computing platform 102, including but not limited to the source data, the processed data, and the derived insights. In practice, this data storage subsystem 102*f* may comprise several different data stores that are configured to store different categories of data. For instance, although not shown in FIG. 1, this data storage subsystem 102*f* may comprise one set of data stores for storing source data and another set of data stores for storing processed data and derived insights. However, the data storage subsystem 102*f* may be structured in various other manners as well. Further, the data stores within the data storage subsystem 102*f* could take any of various forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), message queues, and/or streaming event queues, among other possibilities.

The example computing platform 102 may comprise various other functional subsystems and take various other forms as well.

In practice, the example computing platform 102 may generally comprise some set of physical computing resources (e.g., processors, data storage, etc.) that are utilized to implement the functional subsystems discussed herein. This set of physical computing resources take any of various forms. As one possibility, the computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, the example computing platform 102 may comprise "on-premises" computing resources of the organization that operates the example computing platform 102 (e.g., organization-owned servers). As yet another possibility, the example computing platform 102 may comprise a combination of cloud computing resources and on-premises computing resources. Other implementations of the example computing platform 102 are possible as well.

Further, in practice, the functional subsystems of the example computing platform 102 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

As noted above, the example computing platform 102 may be configured to interact with the data sources 104 and consumer systems 106 over respective communication paths. Each of these communication paths may generally comprise one or more data networks and/or data links, which may take any of various forms. For instance, each respective communication path with the example computing platform 102 may include any one or more of point-to-point data links, Personal Area Networks (PANs), Local Area Networks (LANs), Wide Area Networks (WANs) such as the Internet or cellular networks, and/or cloud networks, among other possibilities. Further, the data networks and/or links that make up each respective communication path may be wireless, wired, or some combination thereof, and may carry data according to any of various different communication protocols. Although not shown, the respective communication paths may also include one or more intermediate systems, examples of which may include a data aggregation system and host server, among other possibilities. Many other configurations are also possible.

It should be understood that network environment 100 is one example of a network environment in which a data platform may be operated, and that numerous other examples of network environments, data platforms, data sources, and consumer systems are possible as well.

In many cases, the data analytics carried out by the computing platform 102 involve very large amounts of data, particularly in the development of machine learning models, whose effectiveness is often based on the amount of data that is used. As discussed above, such analytics may be carried out using, for example, "on demand" computing resources or "on-premises" computing resources. Regardless of the location of the computing resources, such resources may be limited in terms of computing power and available memory when faced with processing and analyzing very large data sets. For example, the size of such data sets may be on the order of hundreds of gigabytes, terabytes, or more, depending on the type of data analytics task to be completed. Such limitations can lead to various difficulties. For example, a very large data set may exceed the physical memory allocated to a particular computing resource assigned to process the data set. Further, on-premises computing resources may be required for other operations within the data platform 102, such that they cannot be devoted to such data analytics tasks in large measure, at the expense other tasks. Still further, while cloud-based computing resources may be employed, such resources are generally associated with costs that increase based on the processing power and memory that is utilized. For this reason, it is not practical to utilize extremely high-powered cloud-based computing resources to process every large data sets as quickly as possible, as the costs of doing so would be extremely prohibitive.

Some current software tools exist that can be used to process large data sets. However, these have various drawbacks. For instance, some existing data analysis tools can perform analytics relatively quickly with relatively smaller data sets. However, such tools may be unable to process data larger than the physical memory allocated to the specific computing resources being used, and may further lack flexibility in terms of data structure, available functions, and other features. Other analysis tools exist that are better suited for processing very large data sets, but such tools frequently require greater coding expertise on the part of users and may similarly be limited in terms of available analysis functions. Accordingly, current data processing tools do not balance these concerns by providing a flexible data processing solution that can efficiently utilize available computing resources to process large-scale data in a universally useable and easily scalable way.

In view of these shortcomings associated with existing data processing solutions for large-scale data, the present disclosure provides a framework for managing large data sets in an efficient manner that considers, and facilitates efficient use of, the particular computing resources available for particular data processing problem. In addition, the framework disclosed herein is not application specific, and is easily accessible to users accustomed to commonly-used front-end tools for manipulating and analyzing large data sets and does not require the users to interface heavily with computing resources, file systems, databases, and other back-end functionality.

Figure 2:
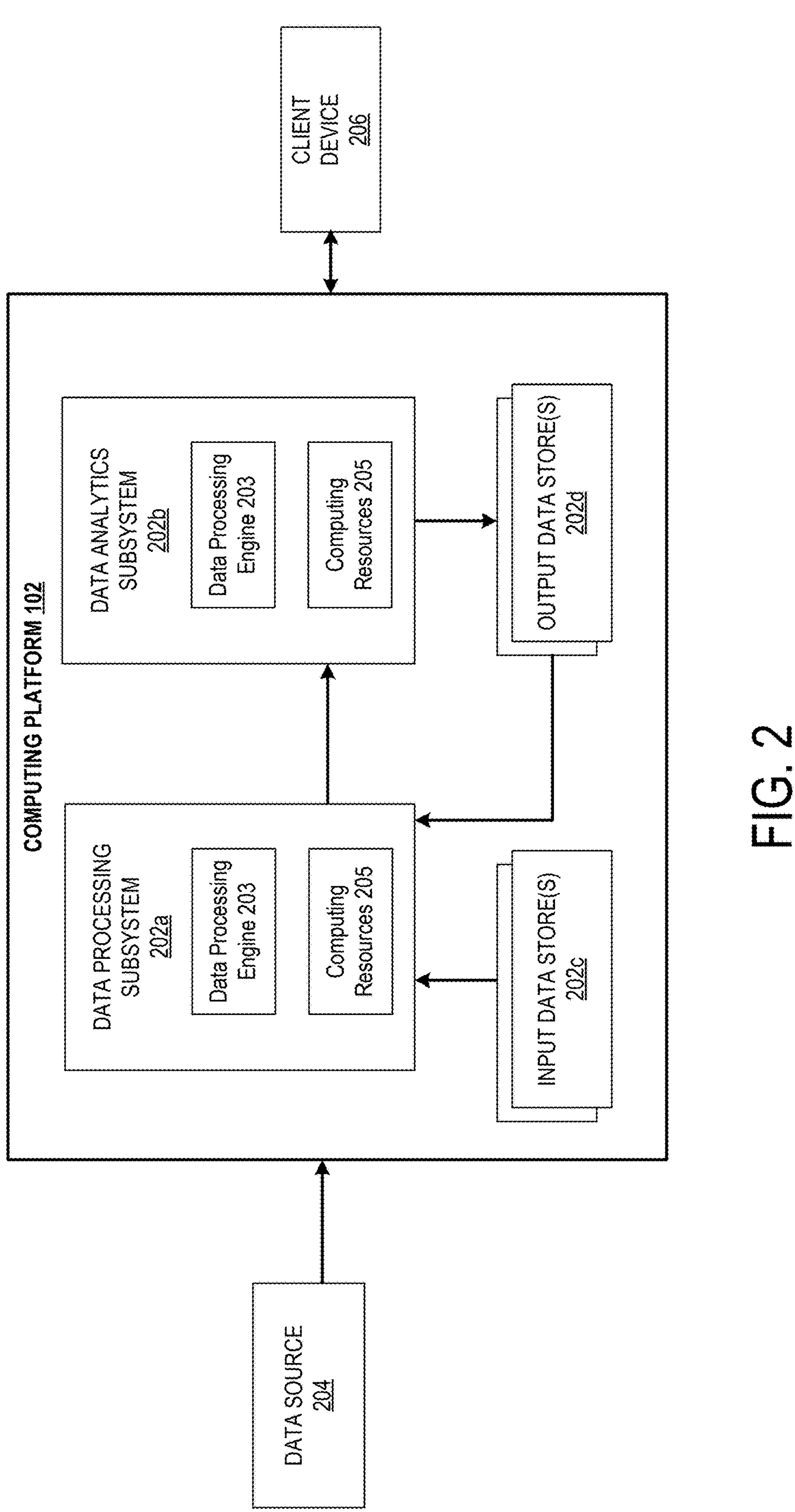
FIG. 2 depicts a simplified block diagram of example subsystems of a data platform that may facilitate the efficient processing of input data that is to be analyzed.

Turning now to FIG. 2, a block diagram is shown to illustrate various functional subsystems of a computing platform, such as the computing platform 102 of FIG. 1, that are each configured to perform certain operations to facilitate the efficient processing of large-scale data in accordance with the disclosed technology. For instance, as shown in FIG. 2, the computing platform 102 may include a data processing subsystem 202*a*, a data analytics subsystem 202*b*, one or more input data stores 202*c*, and one or more output data stores 202*d*, among other possibilities. In practice, it should be understood that some of the functional subsystems shown in FIG. 2 could be subsystems of the higher-level functional subsystems described and shown with reference to FIG. 1, while other of the functional subsystems shown in FIG. 2 could be separate from those higher-level functional subsystems. For example, the data processing subsystem 202*a* may be a subsystem of the data processing subsystem 102*c* shown in FIG. 1, and the data analytics subsystem 202*b* may be a subsystem of the data analytics subsystem 102*d* of FIG. 1. Similarly, the one or more input data stores 202*c*, and the one or more output data stores 202*d* may be considered subsystems of the data storage subsystem 102*f*. Other configurations are also possible.

In accordance with the present disclosure, the data processing subsystem 202*a* may host a new data processing engine 203 for efficiently processing large-scale data, which may take the form of a software application or similar set of software tool(s). The data processing engine 203 may be accessible by a user via a client device, such as client device 206 shown in FIG. 2, which may be similar to one of the client devices 106*a* or 106*b* shown in FIG. 1. For instance, in some implementations the disclosed data processing engine 203 may take the form of a software library that can be used through APIs or a web-based application that a user may access via a web browser on client device 206 or a front-end application (e.g., a mobile application) that a user may launch on client device 206. Other implementations for the disclosed software application are also possible.

In practice, a user of the client station 206 (e.g., a data analyst, a data scientist, etc.) may access the computing platform 102 and identify a data set that is to be analyzed. In some implementations, the data set may be housed at one or more data sources that are not a part of the computing platform 102, such as the data source 204, which may be similar to one of the data sources 104 shown in FIG. 1. Alternatively, the data set may be housed on one or more data stores of the computing platform 102, such as the input data store(s) 202*c*. In this regard, the input data store(s) 202*c* may be a part of the source data subsystems 102*b* or the data storage subsystem 102*f* shown in FIG. 1. As another possibility, the data set may be stored, in part, across any combination of these locations. Other arrangements are also possible.

The user of the client station 206 may define one or more data analysis functions that are to be carried out on the data set, depending on the user's goals. For instance, the user may provide an indication of one or more user-defined functions that may take any of various forms and may support any of numerous different data analytics operations.

These may include, but are not limited to, functions related to machine learning and other operations such as data aggregating, data mining, feature engineering, data cleansing, data reporting, and other functions that require processing of large volumes of input data. The data analysis function can be defined by the user via any existing data processing programming schema or language, including, for example, Python scientific libraries.

As noted above, the computing resources that are available to carry out the user-defined functions on the large-scale input data may be limited in comparison to the volume of data to be analyzed. For example, the data processing subsystem 202*a* and/or the data analytics subsystem 202*b* may include a set of computing resources 205 that are allocated to the user of client station 206 for performing data processing and/or data analytics operations. The computing resource allocation may be defined in terms of a number of processor cores (e.g., 16 cores, 64 cores, etc.) and a size of physical memory (e.g., 32 GB, 512 GB, etc.), among other parameters. The user may provide an indication (e.g., as a user input) of the computing resource allocation to the data processing engine 203. The data processing engine 203 may then utilize this information, in combination with the total size of the input data to be analyzed and the user-defined function that is to be performed, to determine and then implement a data processing pipeline that is specifically tailored to the data analytics task that it be performed.

For example, the data processing engine 203 may utilize one or more application programming interfaces (APIs) to manipulate the input data set to be processed in a manner that makes efficient use of the computing resources available and to apply the user-defined function to the data. In this regard, the data processing engine 203 is configured to manipulate the input data set using three types of operators: row operators, column operators, and join operators, each of which will be discussed in detail herein. Using one, two, or all three types of operators, the data set can be manipulated to facilitate efficient processing based on the processing power and/or physical memory in the computing resources that have been allocated to process the data.

Row operators and column operators can be used to decompose the data set into subsets, each sized such that the computing resources available for use can effectively store and process each data subset as an individual sub-task. For example, if the data set exceeds the memory capacity of the computing resources allocated to the data analysis, the data set can be divided into subsets which are each small enough to be stored in the physical memory of the computing resource and otherwise small enough for the computing resource to process effectively. The data set can be divided into as many subsets as necessary to enable processing of the data set by the computing resources available. Once the data set is divided, the data subsets can be processed as tasks in parallel worker process where multiple computing resources are available to run in parallel.

Join operators can be used to recombine the data subsets post-processing to provide overall results (e.g., one or more outputs of the user-defined function) for the entire data set. Additionally or alternatively, join operators can be used to combine multiple data sets into an overall data set using, for example, a user-defined merge key as discussed in detail below. For example, if a user has multiple data sets to analyze from multiple sources and wants to combine the sets for completeness, convenience, or other reasons, the join operator can be used to combine the multiple data sets into one logical output for analysis. The one logical output can be a single physical data set or multiple physical data sets each representing a different partition of the source data. The logical output can then be manipulated for processing as needed based on the computing resources available, as described above.

In some implementations, the data processing pipeline that is determined and implemented by the data processing engine 203 may include multi-stage processing, where the outputs of one operator are used as the inputs to a next operator, as discussed in further detail in connection with FIG. 5. In this regard, the outputs may be temporarily stored by the computing platform 102 in one or more output data stores, such as the output data store(s) 202*d* shown in FIG. 2. The output data store(s) 202*d* may be a part of the data storage subsystem 102*f* shown in FIG. 1, among other possibilities.

For a given data processing workflow, the data processing engine determines the processing pipeline inside of each row, column or join operator. For each row operator, column operator and/or join operator, the number of subsets and the size of each subset is determined by the data engine after the user specifies all the required inputs in the workflow. The data processing engine calculates number of subsets and size of each subset based on the available computing resources, which is provided as an input by the user as an input, together with the size of the input data and the complexity of the task to be performed. Inside of each row operator, column operator and join operator, the subtasks are organized as a data processing pipeline by the data processing engine. The subtasks are parallel processed in batches until the analysis is completed.

For example, for a given row operator, the data processing engine may decompose the overall analysis task as a plurality of subtasks. The number of CPU cores available can determine the number of subtasks of the plurality of subtasks that can be performed simultaneously in parallel. For example, if a total of M CPU cores are available, the data processing engine can process N (N>>M) subtasks in the pipeline with every M subtasks to be processed in parallel. Whenever any one of the working subtasks finishes, the data processing engine can pick up one subtask from the remaining pipeline for execution. The process continues until all subtasks of the plurality of subtasks are completed. If any of the working subtasks failed, it will be added back to the pipeline to be retried.

Additionally, the data processing engine 203 may be configured to monitor completion of tasks and sub-tasks in the data processing pipeline, and to retry any tasks or sub-tasks that are not successfully completed. For example, the data processing engine 203, in conjunction with determining the data processing pipeline, may determine an expected number of outputs corresponding to the subtasks in each worker process. If the actual number of outputs for a given worker process does not match the expected number of outputs, it may indicate a failure of one or more subtasks in the worker process. Accordingly, the data processing engine 203 may cause the subtasks in the given worker process to be retried. The data processing engine 203 may monitor the expected completion of tasks in various other ways as well.

In this regard, it should be understood that the separation between logical blocks shown in FIG. 2 is provided for schematic purposes only, and that various other arrangements are contemplated. In particular, in addition to performing operations as part of the data processing subsystem 202*a*, the data processing engine 203 may perform one or more analytics operations as part of the data analytics subsystem 202*b*. Accordingly, the data analytics subsystem

202*b* includes a logical block for the data processing engine 203. In this regard, it should be understood that the data processing engine 203 discussed herein may be hosted by either the data processing subsystem 202*a* and the data analytics subsystem 202*b* or collectively by both of them. Similarly, the data analytics subsystem 202*b* may utilize the set of computing resources 205 that are allocated to the user of client station 206 for performing data analytics operations. Accordingly, the data analytics subsystem 202*b* includes a logical block for the computing resources 205.

Figure 3:
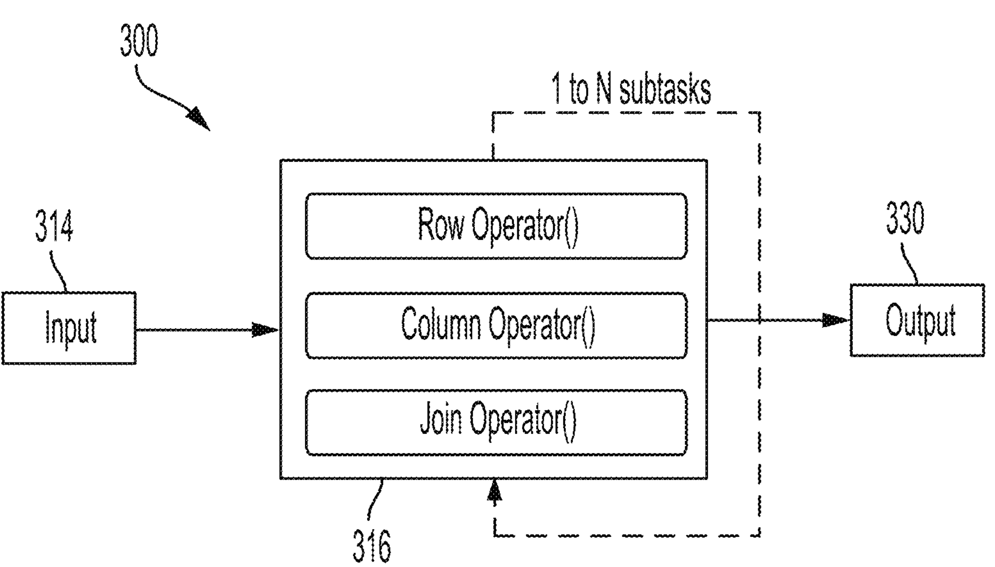
FIG. 3 is a diagram depicting an example workflow for analyzing data.

Referring now to FIG. 3, a schematic example of a data processing workflow 300 for processing input data that may be facilitated by the data processing engine 203 according to the present disclosure is shown. A logical input 314 (e.g., a data set comprising a data file, a combination of data files representing different partitions of the input, or another arrangement of data) is entered into workflow 300, e.g., via a user input or command. The logical input 314 may be provided in structured form, such as a series or array of data values, and may be provided in various formats including, but not limited to, database tables, .csv files, .json files, and other structured formats. The user can design a workflow to be applied to the logical input 314, for example, including one or more of row operators, column operators, and join operators, to achieve a desired logical output. Depending on the size of the logical input 314, the computing resources available, such as physical memory and processing power, and the user-defined workflow which may define one or more of the row operators, column operators and join operators in analysis block 316, the data processing engine 203 may determine the pipelines inside of every row operator, column operator and join operator (which may be cascaded as discussed in connection with FIG. 5) in analysis block 316. The analysis block 316 may comprise any combination of (1) one or more row operators, column operators, and/or join operators configured to facilitate processing of large data sets with available computing resources, and (2) a user-defined function configured for each of the one or more row operators, column operators, and/or join operators to extract insights from the data set using application-specific logic defined by the user based on the particular result desired. As shown in FIG. 3, the workflow 300 produces output 330.

Figure 4:
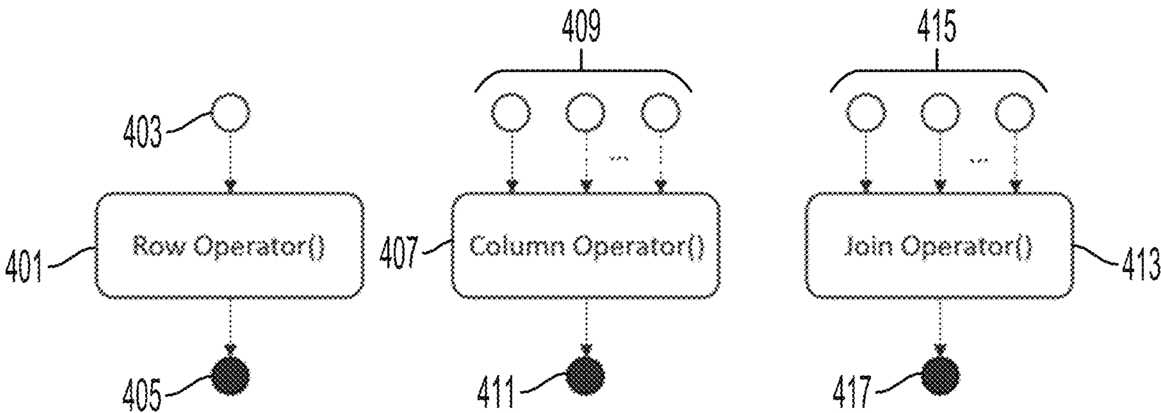
FIG. 4 is a diagram depicting example workflow blocks for analyzing data.

Referring now to FIG. 4, diagrammatical blocks showing each of a row operator 401, a column operator 407, and a join operator 413 are shown. The row operator 401 has one logical input 403 and one logical output 405. The row operator 401 is usable for any operation involving row-wise calculations, i.e., any calculations in which a single row or a group of rows contains the data necessary to obtain a final desired logical result as to that particular row or that particular group of rows. A complete logical output 405 as to the entire logical input 403 can be obtained by aggregating results for individual rows or groups of rows. Row operators are discussed in greater detail below with respect to FIG. 6.

The column operator 407 has one or more logical inputs 409 and one logical output 411. The column operator 407 is usable for any operation involving column-wise calculations, i.e., any calculation in which a single column or a group of columns contains the data necessary to obtain a final desired logical result as to that particular column or that particular group of columns. A complete logical output 411 as to the entire logical input 409 can be obtained by aggregating results for individual columns or groups of columns. Column operators are discussed in greater detail below with respect to FIGS. 7-8.

The join operator 413 has more than one (i.e., two or more) logical inputs 415 and one logical output 417. The join operator 413 is usable to combine multiple logical inputs 415 (e.g., multiple separate data sets) into a single logical output 417 (e.g., a single data set including the multiple separate data sets of the logical inputs 415). Join operators are discussed in greater detail below with respect to FIG. 9.

Figure 5A:
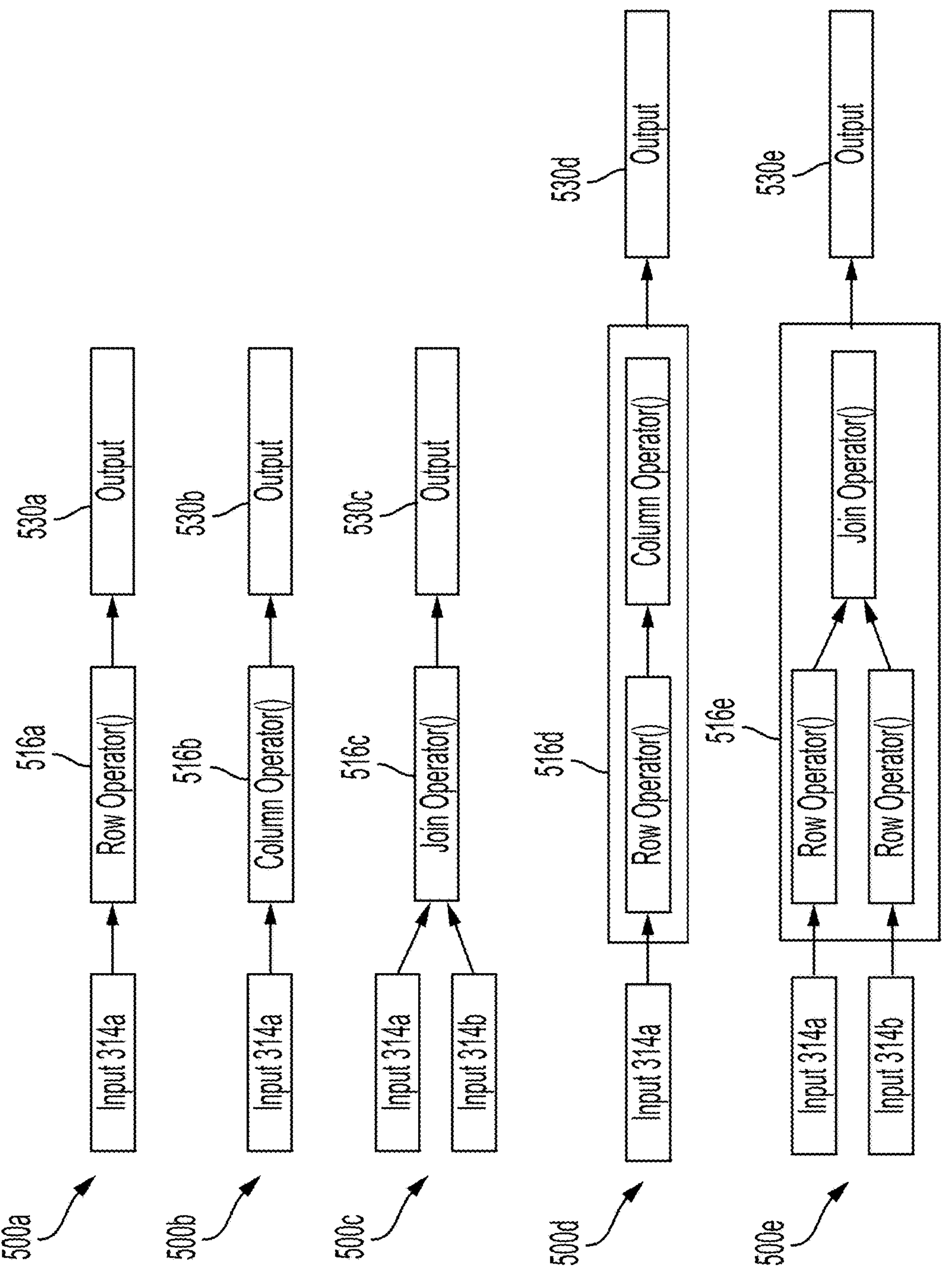
FIG. 5A is a diagram depicting example workflows for analyzing data.
Figure 5B:
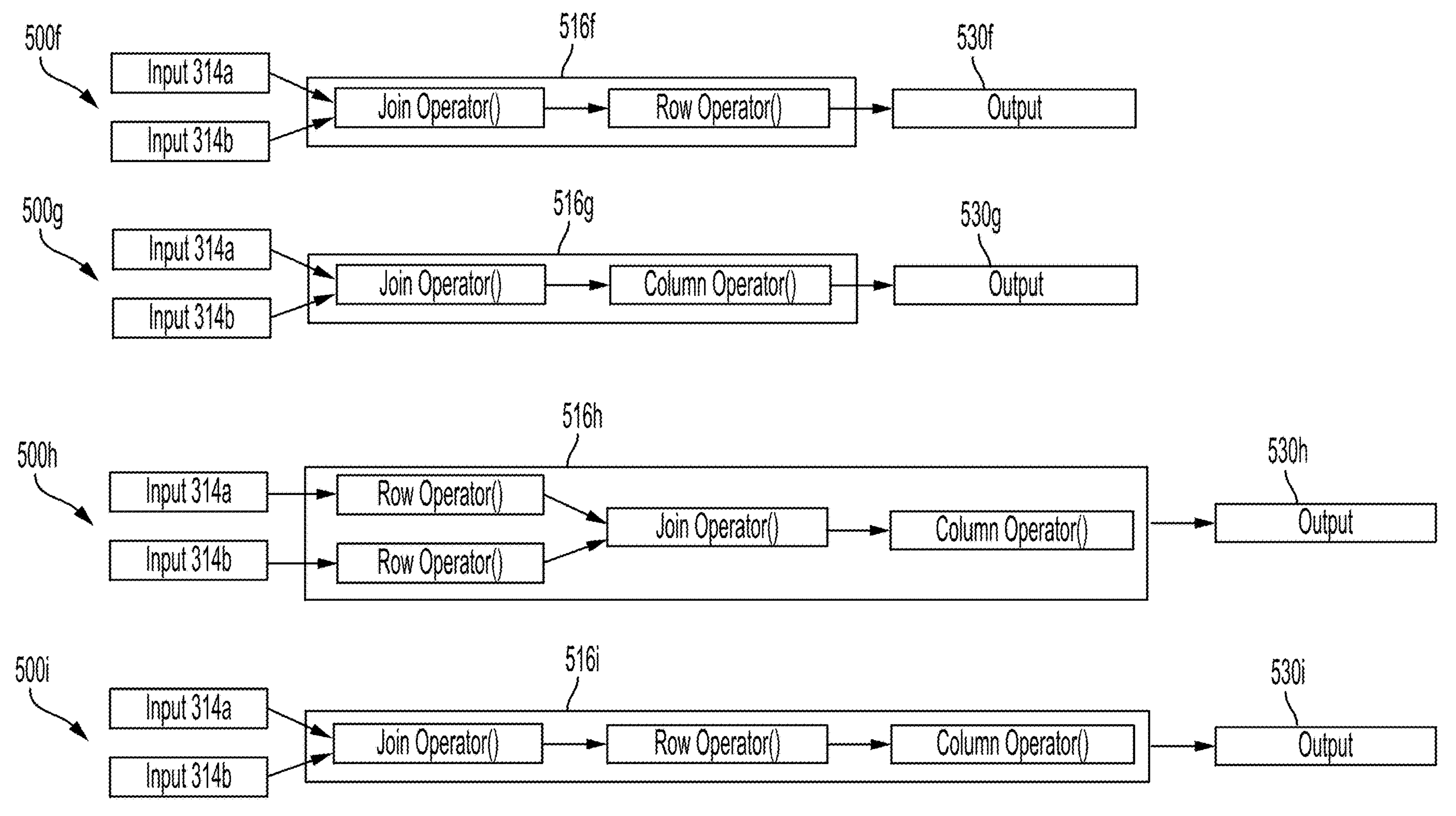
FIG. 5B is a diagram depicting example workflows for analyzing data.

In some situations, parallel computing resources (e.g., multiple processor cores) may be available and multiple data subsets may be processed in parallel, i.e., in a multiple-input multiple-output (MIMO) configuration. Additionally, in some situations, the data processing pipeline 300 (FIG. 3) may perform complex analyses which involve multiple operations (e.g., two or more of row, column, and join operators) applied to the data set. For example, among various other possibilities, FIG. 5A depicts sample workflows 500*a*, 500*b* and 500*c*, which are built based on one single operator within analysis blocks 516*a*, 516*b*, and 516*c*, respectively, and which produce outputs 530*a*, 530*b*, and 530*c*, respectively. Further, FIG. 5A and FIG. 5B depict workflows 500*d*, 500*e*, 500*f*, 500*g*, 500*h*, and 500*i*, which are built based on a combined usage of two or more operators within analysis blocks 516*d*, 516*e*, 516*f*, 516*g*, 516*h*, and 516*i*, respectively, and which produce outputs 530*d*, 530*e*, 530*f*, 530*g*, 530*h*, and 530*i*, respectively. Numerous other example arrangements of the different operators are also possible. In this way, the data processing pipelines contemplated herein can apply various combinations of row operators, column operators, and join operators to carry out the desired analysis based on the input data set(s), the user-defined function(s), and the computing resources available.

Such an approach affords the user flexibility and convenience in approaching analysis problems. For example, to solve complex analysis problems, the user can specify a workflow with any combination of row operators, column operators, and join operators as needed to manipulate one or more logical inputs to achieve a desired output. Furthermore, where the user specifies any such operators in series, the logical outputs from any "upstream" operator can be used as a logical input to any "downstream" operator. For example, referring now to FIG. 5, one illustrative example of such a user-defined workflow process 500 is shown. Logical inputs comprising a first set of input data 514*a* and a second set of input data 514*b* are individually input to respective row operators 504*a* and 504*b*. Logical outputs 506*a* and 506*b* from the respective row operators 504*a* and 504*b* form inputs to a join operator 508. An additional logical input in the form of a third set of input data 514*c* is also input to the join operator 508. A logical output 510 from the join operator 508 forms a logical input to a column operator 512, along with additional logical inputs 514*d* and 514*e*. The column operator 512 provides a logical output 530 as a final desired logical output from the workflow process 500.

Figure 5C:
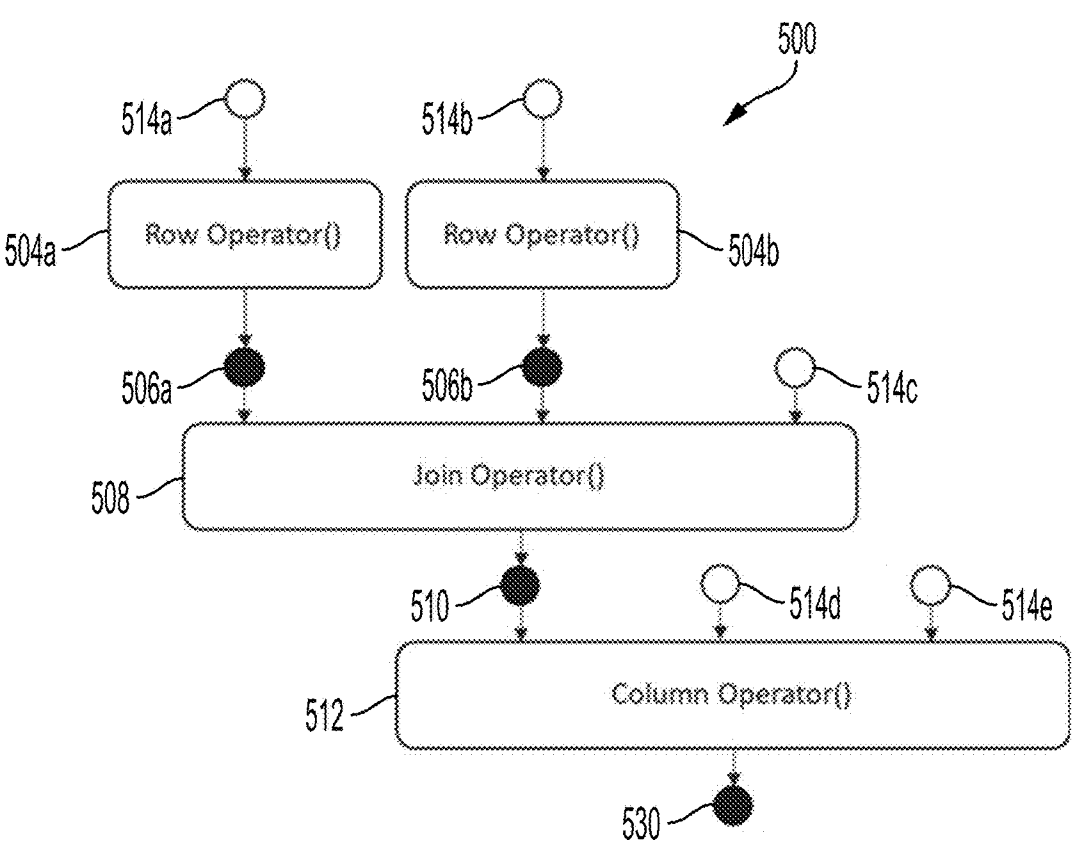
FIG. 5C is a diagram depicting an example workflow for analyzing data.

For the workflow process 500 in FIG. 5, the user defines the nature and arrangement of the various logical inputs and operators. The user also provides an indication of the computing resources available to carry out the analysis defined by the workflow process. The data processing engine (e.g., data processing engine 203) then determines how to divide each of the user-defined operators (e.g., row operators 504*a* and 504*b*, the join operator 508, and the column operator 512) using the input data (e.g., input data 514*a*-514*e*) into sub-tasks that can be carried out efficiently by the computing resources available.

Once the workflow process is arranged by the user, the same process can be carried out with different logical inputs (e.g., input data sets or combinations of input data). The data processing engine can adjust how the sub-tasks are divided based on any changes in the size of input data and/or changes in available computing resources.

Figure 6:
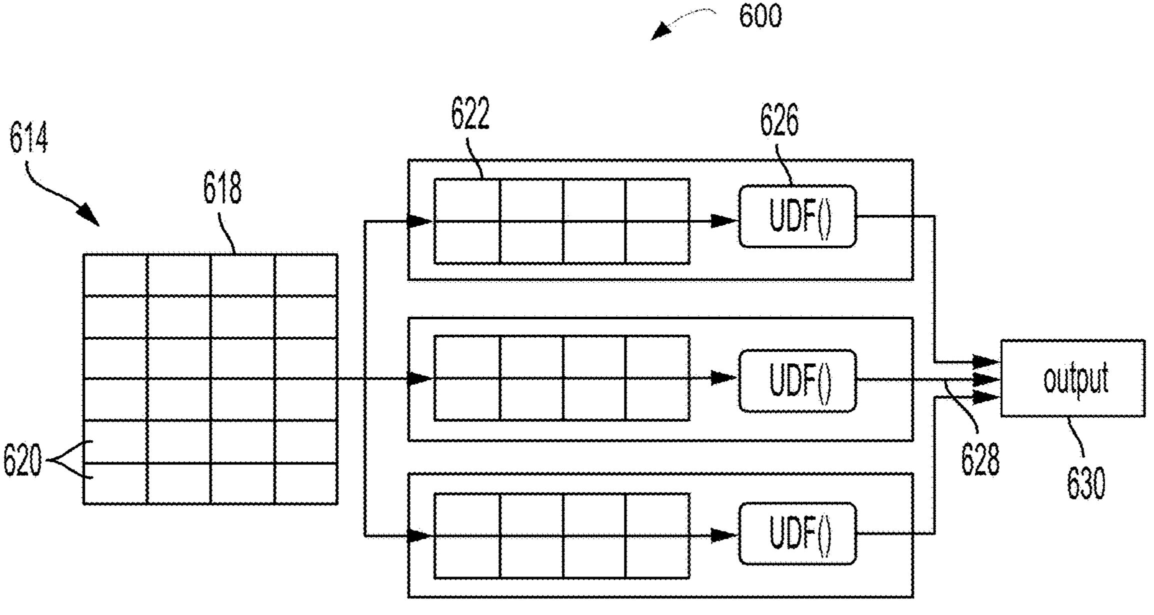
FIG. 6 is a diagram depicting an example pipeline for analyzing data utilizing row-level operators.

FIG. 6 is a schematic workflow diagram of a pipeline 600 showing the function of row operators in greater detail. A logical input 614 including data organized in an array having at least one column 618 and a plurality of rows 620 is identified and entered into the pipeline 600, e.g., by user input or command. The logical input can be any array of data to undergo processing according to a user-defined function. For example, as noted above, the logical input can be a single data set, or multiple data sets representing different partitions of the logical input. Depending on the size of the logical input and the computing resources available, the logical input can be divided along one or more rows to form a plurality of data subsets, each including one or more rows 620 of the logical input 614.

As discussed above, dividing a large data set into smaller subsets can support efficient use of computing resources. To that end, various approaches may be used to divide the logical input (e.g., input data set) into data subsets. For example, in one example approach, the logical input 614 can be divided into data subsets by row using randomization, randomly grouping rows into subsets sized to facilitate processing with the computing resources available. The size of each subset can be chosen to enable processing of that particular subset based on the computing resources available. Alternatively, rather than randomly grouping rows into subsets, the data set can be divided using an organizational schema based on, for example, local aggregations or other groupings defined by the user, data characteristics, or other factors. For instance, a hash function can be implemented by assigning hash values or other indices to each row based on a particular relationship, grouping, or other correlation existing among various rows of the data set. Subsets can then be generated by grouping rows with like hash values, thereby facilitating appropriate groupings of data based on the data structure and desired outcome and supporting efficient processing of data sets. Additionally, subsets can be formed by a combination of randomization and application of a key schema, such as by randomizing assignments of rows within a larger structure defined by the key schema.

Once the logical input 614 is separated by row into data subsets 622, the data subsets are processed by the computing resources according to a user-defined function 626. The user-defined function 626 can be any function suited for row-wise calculations, i.e., calculations in which the desired logical output can be obtained for a given row using only the information contained in that row. For example, each row in a data set may represent an individual data sample to be analyzed and the row operator may apply the user-defined function across all of the data for the individual sample. Following processing of the data subsets according to the user-defined function 626, the respective outputs are optionally recombined at 628 to generate a logical output 630 representing results based on the complete logical input 614.

Figure 7:
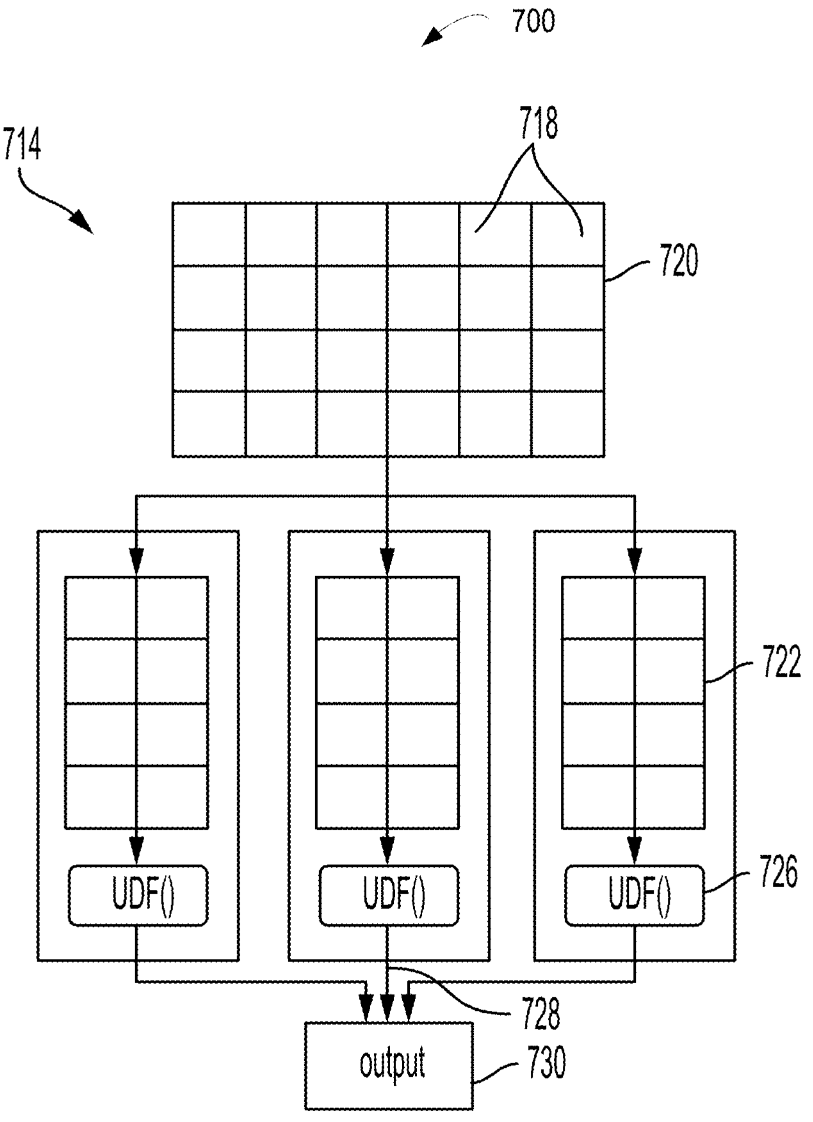
FIG. 7 is a diagram depicting an example pipeline for analyzing data utilizing column-level operators.

FIG. 7 is a schematic workflow diagram of a pipeline 700 showing the function of column operators in greater detail. At 714, a logical input including data organized in an array having at least one row 720 and a plurality of columns 718 is identified and entered into the pipeline 700, e.g., by user input or command. Analogous to the row operators as discussed above, the logical input 714 can be divided by column into a plurality of data subsets 722, each including one or more columns of the plurality of columns 718. Also similar to the approach described above in connection with the row operators, the logical input 714 can be divided into data subsets 722 using randomization, a user-defined schema, pairwise grouping, or other groupings and combinations thereof to form data subsets 722 that are sized to be processed by the available computing resources. In one embodiment, the columns can be randomly divided while maintaining one or more columns in common between one or more subsets. In some embodiments, the data subsets can be formed partially by a user-defined schema and partially by using randomization, such as by randomizing assignments of columns within a structure defined by the user-defined schema.

Once the data set is separated by column into data subsets 722, the data subsets are processed by the computing resources according to a user-defined function 726. The user-defined function 726 can be any function suited for column-wise calculations, i.e., calculations in which the desired logical output can be obtained for a given column using only the information contained in that column. For example, a column operator may be utilized to generate global statistics across a large data set, by analyzing feature-level data that appears in like columns across a large number of data samples. Following processing of the data subsets according to the user-defined function 726, the respective outputs are optionally recombined at 728 to generate a logical output representing results based on the complete logical input 714.

In some cases, a user may desire to analyze multiple data sets using the same user-defined function and obtain results for the multiple data sets concurrently. For example, a user may desire to compare statistics across different sets of data, perform other comparisons, or generate results based on an entire group of data available only by aggregating smaller data sets. Column-level operations can facilitate such tasks. For example, when a column operator is to be applied to more than one logical input, a user can specify a scheme to generate data subsets and respective subtasks. The data processing engine (e.g., data processing engine 203) will then apply the same scheme to each of the logical inputs, so that corresponding columns from each of the logical inputs will be processed together by subtask in the same worker process. In this way, users can perform analyses such as computations and comparisons of information across disparate data sets.

Figure 8:
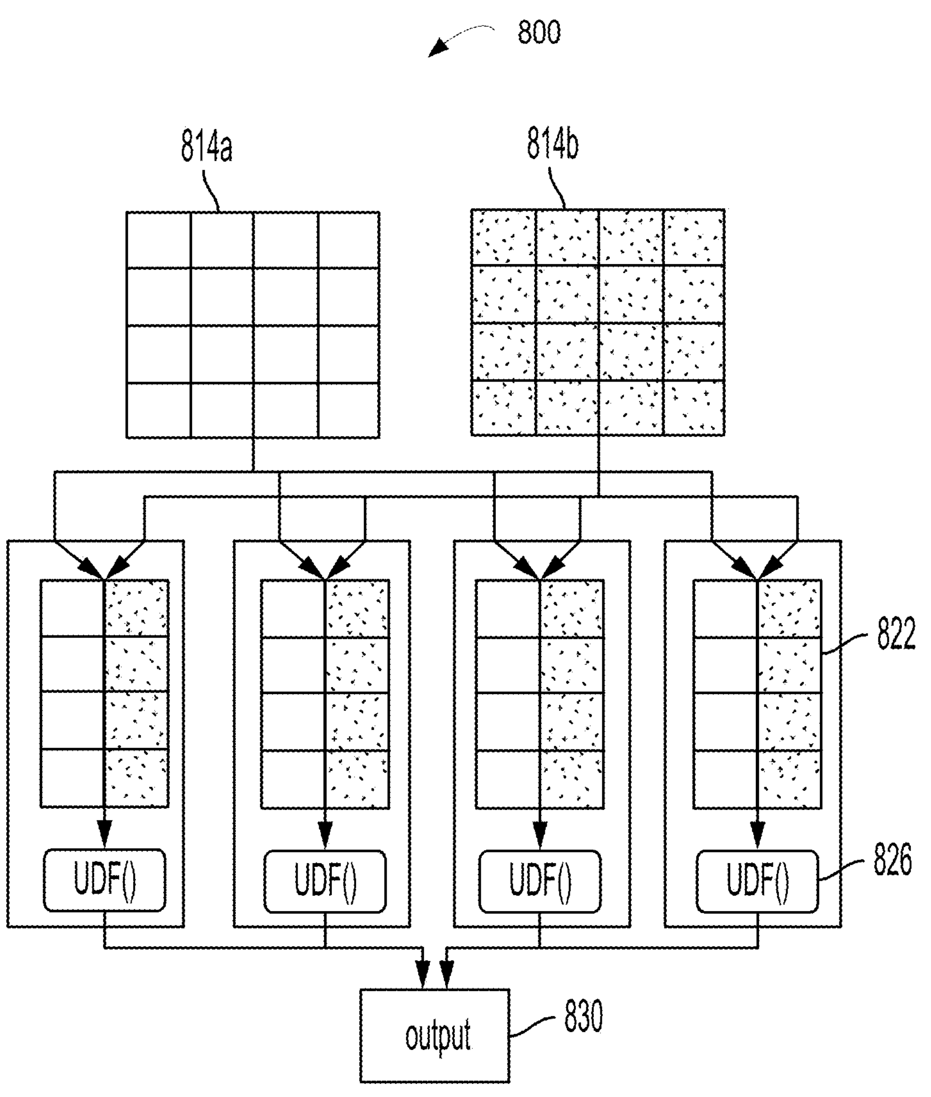
FIG. 8 is a diagram depicting an example pipeline for analyzing data comprised of multiple data inputs.

FIG. 8 is a schematic workflow diagram of a pipeline 800 showing column-level operations including processing of multiple data inputs. As shown in FIG. 8, multiple logical inputs 814*a* and 814*b* form an overall logical input 814 which is identified and entered into the pipeline 800, e.g., by user input or command. In order to process the multiple logical inputs 814*a* and 814*b* efficiently even in cases where computing resources are limited, each of the logical inputs 814*a* and 814*b* can be divided column-wise, and columns of each logical input 814*a* and 814*b* can be combined with one another to form data subsets 822. As shown in FIG. 8, each of the data subsets 822 can include data from each of the logical inputs 814*a* and 814*b*. For example, as noted above, each of the data subsets 822 can include data from like columns (e.g., columns having the same name and/or data type) of each logical input 814*a* and 814*b*.

Once the multiple logical inputs 814*a* and 814*b* are separated into data subsets 822, each of the data subsets 822 is processed according to a user-defined function 826, which can optionally be or include functions comparing values or statistics between logical inputs 814*a* and 814*b*. In the example described in connection with FIG. 8, the user-defined function is a column operator, and the logical inputs 814*a* and 814*b* are suited for column-wise calculations, i.e., calculations in which the desired logical output can be obtained for a given column using only the information contained in that column. Following processing by the user-defined function 826, a logical output 830 is generated.

Further, although FIG. 8 shows two logical inputs 814*a* and 814*b*, the foregoing approach can be used for any number of multiple logical inputs.

Figure 9:
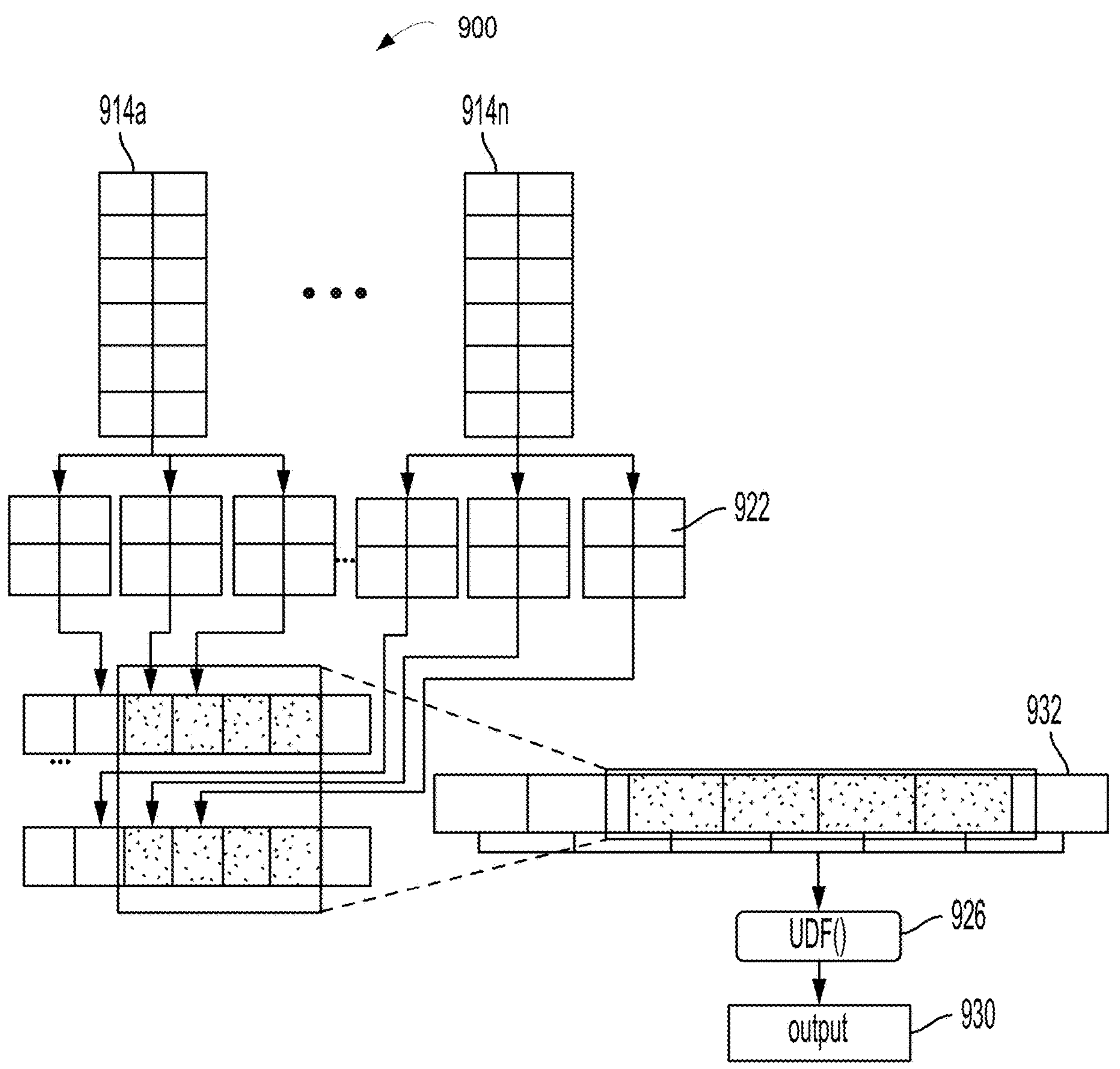
FIG. 9 is a diagram depicting another example pipeline for analyzing data comprised of multiple data inputs.

Additionally, various analysis tasks requiring (1) merging multiple data sets and/or (2) recombining data subsets divided via one or both of row operators and column operators according to the disclosure can be accomplished using join operators and a user-specified merge key. The user-specified merge key can be, for example, values of one or more columns common across every logical input. In the context of financial transaction data, one example of a user-defined merge key may be an account ID value, or the combination of an account ID and a given month, which may represent transaction data for a given account ID in a given month. FIG. 9 is a schematic workflow diagram of a pipeline 900 showing an example of a join operator and its overall function in the context of an analysis task. In FIG. 9, logical inputs 914*a*-914*n* form a group of data sets for which an analysis will be performed. In the present disclosure, the number of data inputs represented by n is not specifically limited. As shown in FIG. 9, logical inputs 914*a*-914*n* are divided into respective data subsets 922. In some embodiments of the present disclosure, depending on the size and number of logical inputs, the logical inputs 914*a*-914*n* can be divided and recombined using a hash value derived from the user-specified merge key. In this regard, a given hash value may have a one to many relationship with the user-selected merge key. For instance, where the user-specified merge key is an account ID value, an example hash value may be the last two digits of each account ID, such that each hash value from "00" through "99 corresponds to many different merge keys. In this way, the hash value may be utilized to sub-divide the input data into one hundred sub-parts. The hash value may be derived from the merge key in other ways as well.

The data subsets 922, once divided and associated with corresponding hash values, are arranged in a merged data series 932. The data values in the data series 932 can be arranged by hash values such that records with related hash values are associated with one another. For example, data values representing related information in different source data sets that have the same hash value are grouped together regardless of the original source. In other words, values from various logical inputs 914*a*-914*n* can be grouped together in the merged data series 932 regardless of the logical input 914*a*-914*n* in which they originally appeared. In this way, large collections of input data sets can be combined in smaller groups to perform merging with records only from each of the smaller groups by merge keys. Such a process not only makes the data merging operation more scalable, but also more efficient.

The data values in the data series 932 are then processed by a user-defined function 926 to generate logical result 930, which can be stored, provided to the user, etc. In the embodiment of FIG. 9, the user-defined function for join operator is the same as the one for row operator and the logical inputs 914*a* and 914*n* are suited for row-wise calculations, i.e., calculations in which the desired logical output can be obtained for a given row or a group of rows using only the information contained in that row or a particular group of rows.

Figure 10:
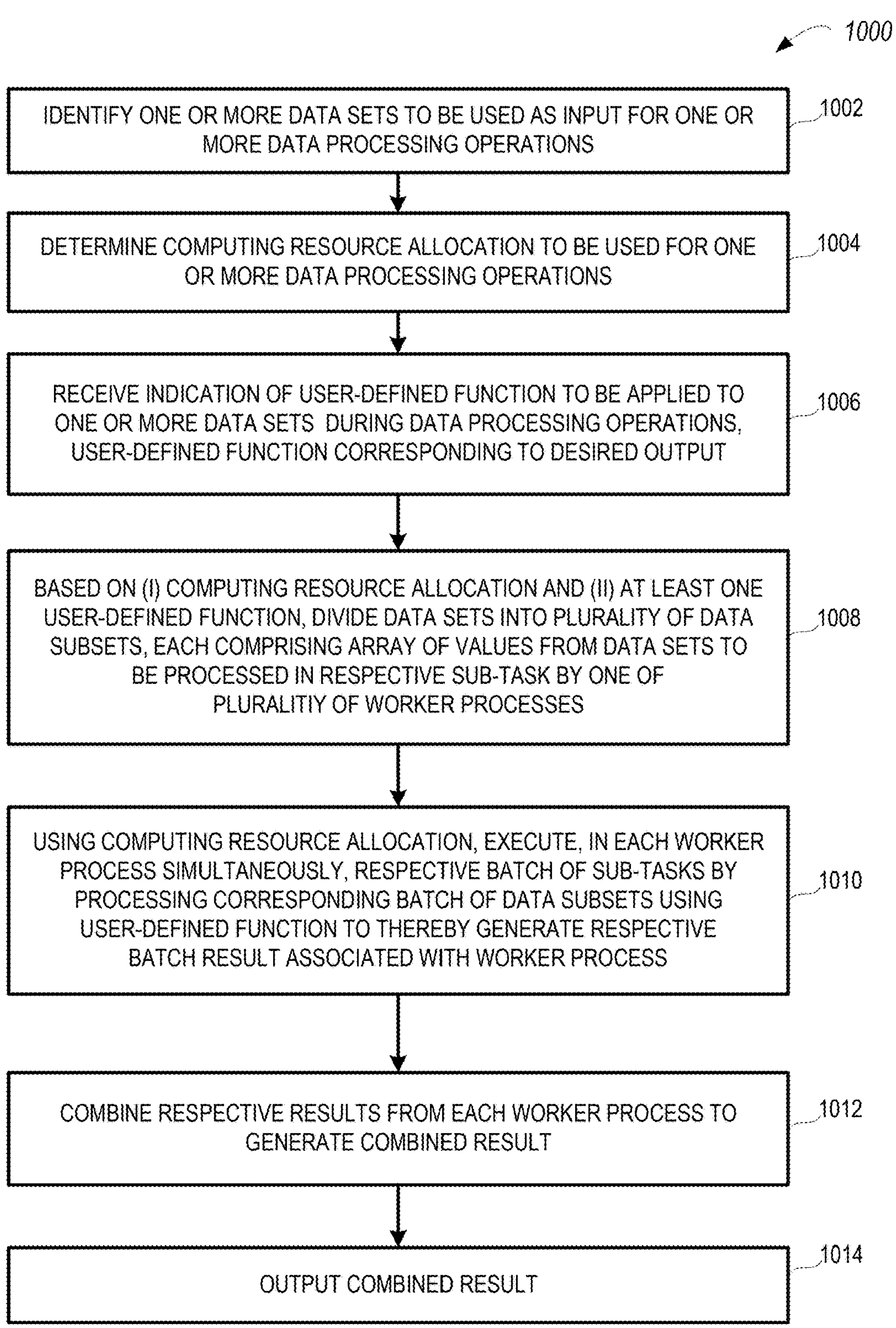
FIG. 10 is a flowchart depicting another example process flow for analyzing data.

FIG. 10 shows a diagram of an example process flow 1000 which describes the common pipeline inside of three types of operators which is implemented in the disclosed data processing engine 203. At 1002, a data processing engine (such as data processing engine 203 discussed in connection with FIG. 2) identifies one or more data sets to be used as the logical inputs for one or more data processing operations. At 1004, the data processing engine determines a computing resource allocation to be used for the one or more data processing operations. As discussed above, the computing resource could include physical memory and one or more processors, and may be cloud-based (e.g., IaaS), on-premises, or other configurations. At 1006, the data processing engine receives an indication of at least one user-defined function to be applied to the one or more data sets during the one or more data processing operations. The at least one user-defined function may correspond to a desired output of the one or more data processing operations. At 1008, based on (i) the computing resource allocation and (ii) the at least one user-defined function, the data processing engine divides the one or more data sets into a plurality of data subsets, each comprising an array of values from the one or more data sets to be processed in a respective sub-task by one of a plurality of worker processes. Alternatively, the data processing engine may generate an arrangement for dividing the one or more data sets into a plurality of data subsets without physically dividing the one or more data sets. For example, the data processing engine may generate a partition scheme that indicates how and when each portion of one or more data sets should be accessed, by the eventual sub-task that will process the portion of the data set, without physically separating the one or more data sets at the time the partition scheme is generated. Unlike the row operator in which each sub-task only works with one data subset, each sub-task may work with multiple respective data subsets which are divided from one or more input data sets and grouped together by the data engine in column operator and join operator.

When realizing any one of the row operator, column operator, or join operator, the data processing engine 203 divides the one or more data sets of the logical input into data subsets, either physically or by partition, as discussed in connection with FIGS. 3-9. At 1010, the data subsets are processed in respective sub-tasks with a plurality of parallel worker process. Normally one worker process is a working thread of the data engine with a dedicated CPU core. In this regard, the data processing engine 203 may utilize the computing resource allocation to execute, in each worker process simultaneously, a respective batch of sub-tasks by processing a corresponding batch of respective data subsets using the user-defined function to thereby generate a respective batch of results associated with the worker process. For example, suppose that there are a total of N sub-tasks initialized by the data processing engine. A total of M worker process are initialized by the data processing engine corresponding to M available CPU cores. For the first sub-task, using the allocated computing resource (e.g., a first CPU core of a plurality of available CPU cores), the data processing engine executes, in a first worker process, the first sub-task by processing a first data subset of the plurality of data subsets using the user-defined function to thereby generate a first result associated with the first worker process. As each sub-task in the first worker process finishes, the data processing engine may assign an additional sub-task from the remaining pipeline for execution by the first CPU core by the first worker process, the result of which is combined with each previous result in the first worker process and the results from the rest worker process to generate a final result. Meanwhile, for a K-th sub-task, using the allocated computing resource (e.g., a K-th CPU core of a plurality of available CPU cores, where K M), the data processing engine executes, in a K-th worker process, the K-th sub-task by processing a K-th data subset of the plurality of data subsets using the user-defined function to thereby generate a K-th result associated with the K-th worker process. Similar to the first worker process, as each sub-task in the K-th worker process finishes, the data processing engine may assign an additional sub-task from the remaining pipeline for execution by the K-th CPU core in the K-th worker process, the result of which is combined with the each previous result in the K-th worker process and the results from other worker process to generate the final result. In the current example, because there are M worker process, a total of M sub-tasks may be executed in parallel. Accordingly, each additional sub-task in the pipeline beyond the total number of worker process (K>M) will be assigned to a given worker process in which another sub-task has finished executing.

At 1012, the data processing engine combines the respective batch results from each worker process of the plurality of worker process (collectively including N total results) to generate a combined result. At 1014, the data processing engine outputs the combined result. For instance, the output can be provided to data store **202*d* shown and discussed in connection with FIG. 2**, where the output can be stored such that it is available for the user to retrieve and use.

Figure 11:
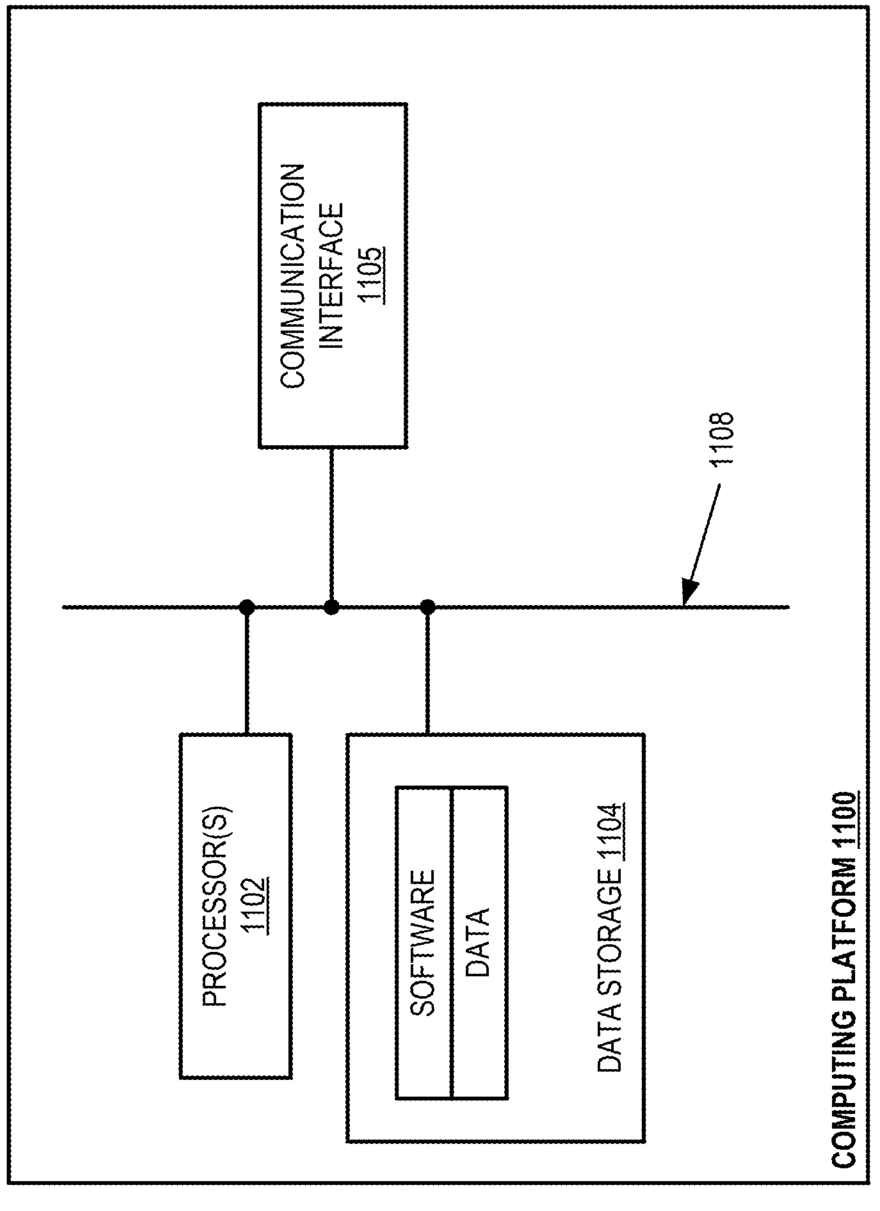
FIG. 11 is a simplified block diagram that illustrates some structural components that may be included in an example data platform.

Turning now to FIG. 11, a simplified block diagram is provided to illustrate some structural components that may be included in an example computing platform 1100. For example, computing platform 1100 could serve as the computing platform 102 shown in FIG. 1 and may be configured to carry out any of the various functions disclosed herein—including but not limited to the functions described in connection with FIGS. 2-10. At a high level, computing platform 1100 may generally comprise any one or more computer systems (e.g., one or more servers) that collectively include at least a processor 1102, data storage 1104, and a communication interface 1106, all of which may be communicatively linked by a communication link 1108 that may take the form of a system bus, a communication network such as a public, private, or hybrid cloud, or some other connection mechanism. Each of these components may take various forms.

For instance, processor 1102 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 1102 could comprise processing components that are distributed across a plurality of physical computing devices connected via a network, such as a computing cluster of a public, private, or hybrid cloud.

In turn, data storage 1104 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 1104 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 11, data storage 1104 may be capable of storing both (i) program instructions that are executable by processor 1102 such that the computing platform 1100 is configured to perform any of the various functions disclosed herein (including but not limited to any the functions described in connection with FIG. 2-10), and (ii) data that may be received, derived, or otherwise stored by computing platform 1100.

Communication interface 1105 may take the form of any one or more interfaces that facilitate communication between computing platform 1100 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

It should be understood that computing platform 1100 is one example of a computing platform that may be used with the embodiments described herein. Numerous other arrangements are possible and contemplated herein. For instance, other computing systems may include additional components not pictured and/or more or less of the pictured components.

Figure 12:
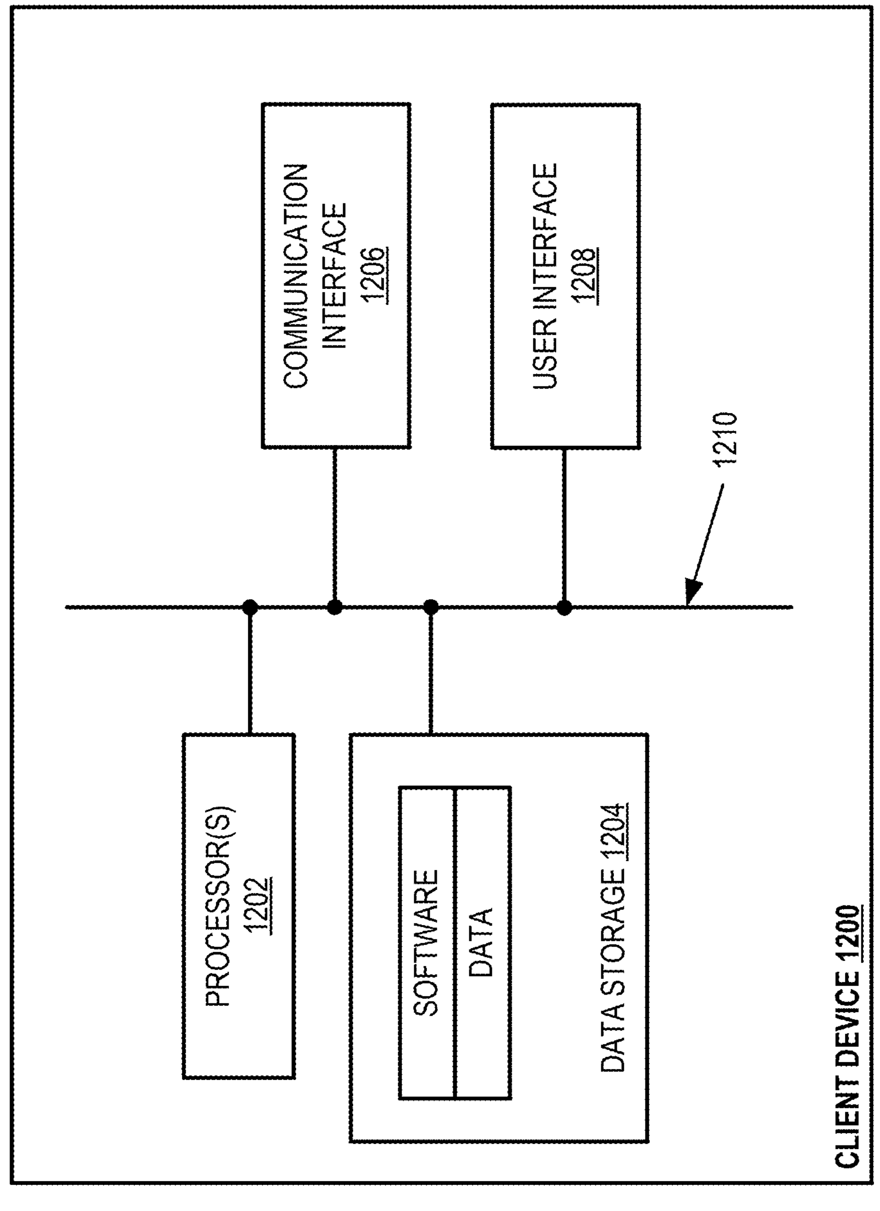
FIG. 12 is a simplified block diagram that illustrates some structural components that may be included in an example client device.

Turning now to FIG. 12, a simplified block diagram is provided to illustrate some structural components that may be included in an example client device 1200. For example, client device 1200 may be configured to carry out any of the various subsystem functions disclosed herein—including but not limited to the functions described in connection with FIGS. 3-9. At a high level, client device 1200 may generally comprise a processor 1202, data storage 1204, a communication interface 1206, and a user interface 1208, all of which may be communicatively linked by a communication link 1210 that may take the form of a system bus or some other connection mechanism. Each of these components may take various forms.

For instance, processor 1202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 1202 could comprise processing components that are distributed across a plurality of physical computing devices connected via a network, such as a computing cluster of a public, private, or hybrid cloud.

In turn, data storage 1204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 1204 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 12, data storage 1204 may be capable of storing both (i) program instructions that are executable by processor 1202 such that the client device 1200 is configured to perform any of the various functions disclosed herein (including but not limited to any of the functions described in connection with FIGS. 2-10), and (ii) data that may be received, derived, or otherwise stored by client device 1200.

Communication interface 1206 may take the form of any one or more interfaces that facilitate communication between client device 1200 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

The client device 1200 may additionally include a user interface 1208 for connecting to user-interface components that facilitate user interaction with the client device 1200, such as a keyboard, a mouse, a trackpad, a display screen, a touch-sensitive interface, a stylus, a virtual-reality headset, and/or speakers, among other possibilities.

It should be understood that client device 1200 is one example of a client device that may be used with the embodiments described herein. Numerous other arrangements are possible and contemplated herein.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computing platform comprising:

at least one processor;

a non-transitory computer-readable medium; and program instructions stored on the non-transitory computer-readable medium that, when executed by the at least one processor, cause the computing platform to:

receive, from a client station, an indication of one or more data sets to be used as input for one or more data processing operations;

receive, from the client station, an indication of a computing resource allocation to be used for the one or more data processing operations;

receive, from the client station, an indication of at least one user-defined function to be applied to the one or more data sets during the one or more data processing operations, the at least one user-defined function comprising at least one operator to be applied to the one or more data sets;

determine that a size of the one or more data sets exceeds a physical memory capacity of the computing resource allocation;

based on (i) determining that the size of the one or more data sets exceeds a physical memory capacity of the computing resource allocation and (ii) the at least one operator:

decompose the at least one operator into a plurality of sub-tasks; and divide the one or more data sets into a plurality of data subsets, each data subset comprising an array of values from the one or more data sets to be processed in a respective sub-task of the plurality of sub-tasks by one of a plurality of parallel worker processes;

using the computing resource allocation, execute, in each worker process simultaneously, a respective batch of sub-tasks by processing a corresponding batch of respective data subsets using the at least one user-defined function;

based on processing a corresponding batch of respective data subsets using the at least one user-defined function, generate a respective batch result associated with the worker process;

combine the respective batch results from each worker process of the plurality of parallel worker processes to generate a combined result; and output, to the client station, the combined result.

2. The computing platform of claim 1, wherein:

the one or more data sets comprises a plurality of rows of data and one or more columns of data; and wherein the program instructions that cause the computing platform to divide the one or more data sets into a plurality of data subsets comprise program instructions that cause the computing platform to divide the one or more data sets into a plurality of data subsets each comprising one or more rows of the plurality of rows of data.

3. The computing platform of claim 2, wherein the program instructions that cause the computing platform to divide the one or more data sets into a plurality of data subsets comprise program instructions that, when executed by the at least one processor, cause the computing platform to divide the one or more data sets into a plurality of data subsets each comprising one or more rows of the plurality of rows of data by randomly assigning one or more rows of the plurality of rows of data to a data subset of the plurality of data subsets.

4. The computing platform of claim 2, wherein the program instructions that cause the computing platform to divide the one or more data sets into a plurality of data subsets comprise program instructions that cause the computing platform to divide the one or more data sets into a plurality of data subsets each comprising one or more rows of the plurality of rows of data by:

assigning each row of the plurality of rows of data a hash key from a plurality of hash keys; and grouping rows of the plurality of rows of data based on assigned hash keys.

5. The computing platform of claim 1, wherein:

the one or more data sets comprises a plurality of columns of data and one or more rows of data; and wherein the program instructions that cause the computing platform to divide the one or more data sets into a plurality of data subsets comprise program instructions that cause the computing platform to divide the one or more data sets into a plurality of data subsets, wherein each data subset of the plurality of data subsets comprises one or more columns of the plurality of columns of data.

6. The computing platform of claim 5, wherein the program instructions that cause the computing platform to divide the one or more data sets into a plurality of data subsets comprise program instructions that cause the computing platform to divide the one or more data sets into a plurality of data subsets, wherein each data subset of the plurality of data subsets comprises one or more columns of the plurality of columns of data, by one or both of (i) randomly assigning one or more columns of the plurality of columns of data to a data subset of the plurality of data subsets and (ii) assigning one or more columns of the plurality of columns of data to a data subset of the plurality of data subsets based on a user-defined schema.

7. The computing platform of claim 1, wherein the program instructions that cause the computing platform to receive, from a client station, an indication of one or more data sets to be used as input for one or more data processing operations comprise program instructions that cause the computing platform to receive, from the client station, a first data set and at least a second data set to be used as input for the one or more data processing operations, wherein the one or more data processing operations comprise joining the first data set with at least the second data set to form a merged data set; and wherein the program instructions that cause the computing platform to divide the one or more data sets into a plurality of data subsets comprise program instructions that cause the computing platform to divide each data set into a plurality of data subsets each comprising one or more rows of a plurality of rows of data by:

assigning each row of the plurality of rows of data a hash key from a plurality of hash keys; and grouping rows of the plurality of rows of data based on assigned hash keys; and wherein the computing platform further comprises program instructions stored on the non-transitory computer-readable medium that, when executed by the at least one processor, cause the computing platform to join each respective subset of the first data set with corresponding subsets of at least the second data set having the same hash keys based on a user-defined merge key, thereby forming the merged data set.

8. The computing platform of claim 1, wherein the computing resource allocation comprises a plurality of processor cores, wherein each processor core in the plurality of processor cores executes the respective batch of sub-tasks in a respective one of the plurality of parallel worker processes.

9. The computing platform of claim 1, wherein the program instructions that cause the computing platform to receive, from the client station, an indication of a computing resource allocation to be used for the one or more data processing operations comprise program instructions that cause the computing platform to receive, from the client station, an indication of the computing resource allocation based on total available computing resources.

10. A non-transitory computer-readable medium, wherein the non-transitory computer-readable medium is provisioned with program instructions that, when executed by at least one processor, cause a computing platform to:

receive, from a client station, an indication of one or more data sets to be used as input for one or more data processing operations;

receive, from the client station, an indication of a computing resource allocation to be used for the one or more data processing operations;

receive, from the client station, an indication of at least one user-defined function to be applied to the one or more data sets during the one or more data processing operations, the at least one user-defined function comprising at least one operator to be applied to the one or more data sets;

determine that a size of the one or more data sets exceeds a physical memory capacity of the computing resource allocation:

based on (i) determining that the size of the one or more data sets exceeds a physical memory capacity of the computing resource allocation and (ii) the at least one operator:

decompose the at least one operator into a plurality of sub-tasks; and divide the one or more data sets into a plurality of data subsets, each data subset comprising an array of values from the one or more data sets to be processed in a respective sub-task of the plurality of sub-tasks by one of a plurality of parallel worker processes;

using the computing resource allocation, execute, in each worker process simultaneously, a respective batch of sub-tasks by processing a corresponding batch of respective data subsets using the at least one user-defined function;

based on processing a corresponding batch of respective data subsets using the at least one user-defined function, generate a respective batch result associated with the worker process;

combine the respective batch results from each worker process of the plurality of parallel worker processes to generate a combined result; and output, to the client station, the combined result.

11. The non-transitory computer-readable medium of claim 10, wherein:

the one or more data sets comprises a plurality of rows of data and one or more columns of data; and wherein the program instructions that cause the computing platform to divide the one or more data sets into a plurality of data subsets comprise program instructions that cause the computing platform to divide the one or more data sets into a plurality of data subsets each comprising one or more rows of the plurality of rows of data.

12. The non-transitory computer-readable medium of claim 11, wherein the program instructions that cause the computing platform to divide the one or more data sets into a plurality of data subsets comprise program instructions that cause the computing platform to divide the one or more data sets into a plurality of data subsets each comprising one or more rows of the plurality of rows of data by randomly assigning one or more rows of the plurality of rows of data to a data subset of the plurality of data subsets.

13. The non-transitory computer-readable medium of claim 11, wherein the program instructions that cause the computing platform to divide the one or more data sets into a plurality of data subsets comprise program instructions that cause the computing platform to divide the one or more data sets into a plurality of data subsets each comprising one or more rows of the plurality of rows of data by:

assigning each row of the plurality of rows of data a hash key from a plurality of hash keys; and grouping rows of the plurality of rows of data based on assigned hash keys.

14. The non-transitory computer-readable medium of claim 10, wherein:

the one or more data sets comprises a plurality of columns of data and one or more rows of data; and wherein the program instructions that cause the computing platform to divide the one or more data sets into a plurality of data subsets comprise program instructions that cause the computing platform to divide the one or more data sets into a plurality of data subsets, wherein each data subset of the plurality of data subsets comprises one or more columns of the plurality of columns of data.

15. The non-transitory computer-readable medium of claim 14, wherein the program instructions that cause the computing platform to divide the one or more data sets into a plurality of data subsets comprise program instructions that cause the computing platform to divide the one or more data sets into a plurality of data subsets, wherein each data subset of the plurality of data subsets comprises one or more columns of the plurality of columns of data, by one or both of (i) randomly assigning one or more columns of the plurality of columns of data to a data subset of the plurality of data subsets and (ii) assigning one or more columns of the plurality of columns of data to a data subset of the plurality of data subsets based on a user-defined schema.

16. A method carried out by a computing platform, the method comprising:

receiving, from a client station, one or more data sets to be used as input for one or more data processing operations;

receiving, from the client station, a computing resource allocation to be used for the one or more data processing operations;

receiving, from the client station, an indication of at least one user-defined function to be applied to the one or more data sets during the one or more data processing operations, the at least one user-defined function comprising at least one operator to be applied to the one or more data sets;

determining that a size of the one or more data sets exceeds a physical memory capacity of the computing resource allocation:

based on (i) determining that the size of the one or more data sets exceeds a physical memory capacity of the computing resource allocation and (ii) the at least one operator:

decomposing the at least one operator into a plurality of sub-tasks; and dividing the one or more data sets into a plurality of data subsets, each data subset comprising an array of values from the one or more data sets to be processed in a respective sub-task of the plurality of sub-tasks by one of a plurality of parallel worker processes;

using the computing resource allocation, executing, in each worker process simultaneously, a respective batch of sub-tasks by processing a corresponding batch of respective data subsets using the at least one user-defined function;

based on processing a corresponding batch of respective data subsets using the at least one user-defined function, generating a respective batch result associated with the worker process;

combining the respective batch results from each worker process of the plurality of parallel worker processes to generate a combined result; and outputting, to the client station, the combined result.

17. The method of claim 16, wherein:

the one or more data sets comprises a plurality of rows of data and one or more columns of data; and wherein dividing the one or more data sets into a plurality of data subsets comprises dividing the one or more data sets into a plurality of data subsets each comprising one or more rows of the plurality of rows of data.

18. The method of claim 17, wherein dividing the one or more data sets into a plurality of data subsets comprises:

assigning each row of the plurality of rows of data a hash key from a plurality of hash keys; and grouping rows of the plurality of rows of data based on assigned hash keys.

19. The method of claim 16, wherein:

the one or more data sets comprises a plurality of columns of data and one or more rows of data; and wherein dividing the one or more data sets into a plurality of data subsets comprises dividing the one or more data sets into a plurality of data subsets, wherein each data subset of the plurality of data subsets comprises one or more columns of the plurality of columns of data.

20. The method of claim 19, wherein dividing the one or more data sets into a plurality of data subsets comprises dividing the one or more data sets into a plurality of data subsets, wherein each data subset of the plurality of data subsets comprises one or more columns of the plurality of columns of data, by one or both of (i) randomly assigning one or more columns of the plurality of columns of data to a data subset of the plurality of data subsets and (ii) assigning one or more columns of the plurality of columns of data to a data subset of the plurality of data subsets based on a user-defined schema.

* * * * *